Sept. 9, 1958 J. W. SCHNABEL 2,850,879
MULTIPLE ACCESSORY CONTROL VALVE
Filed June 29, 1956 3 Sheets-Sheet 3
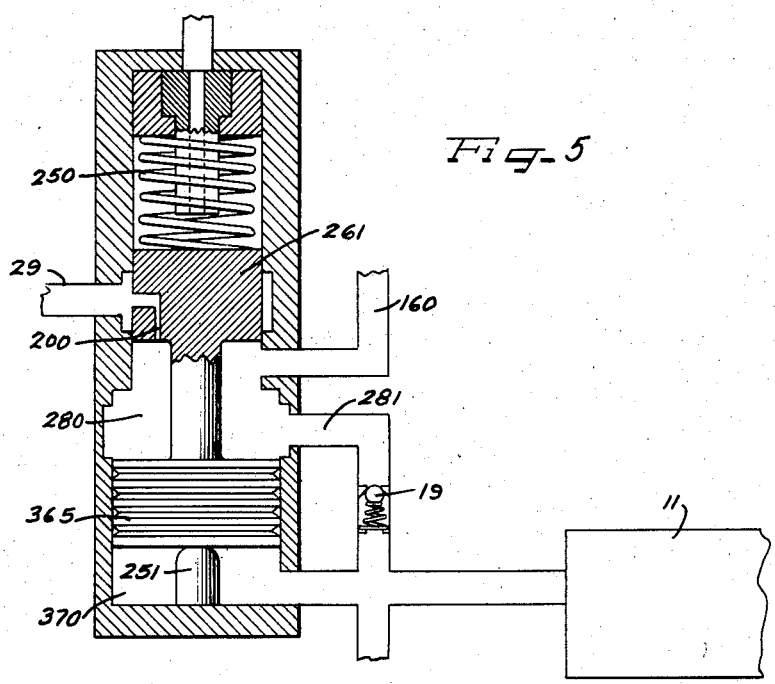
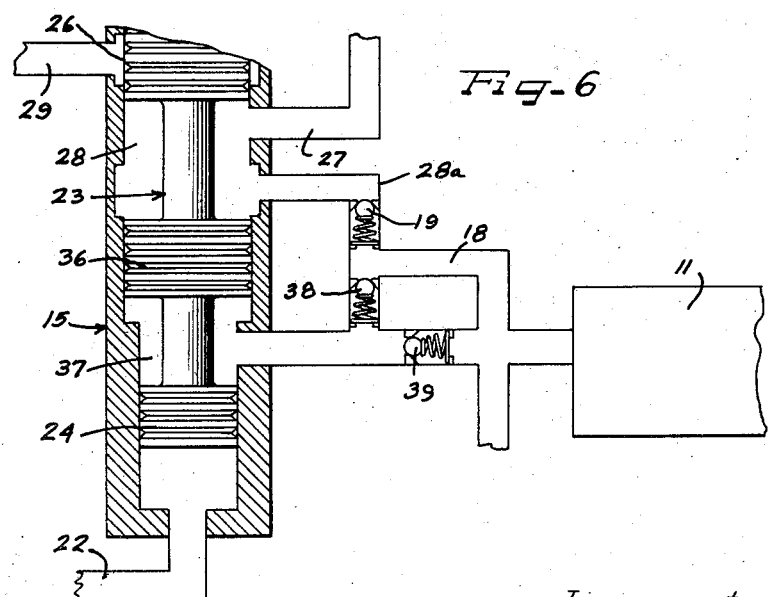
Inventor
JULIUS W. SCHNABEL United States Patent Office 2,850,879
Patented Sept. 9, 1958

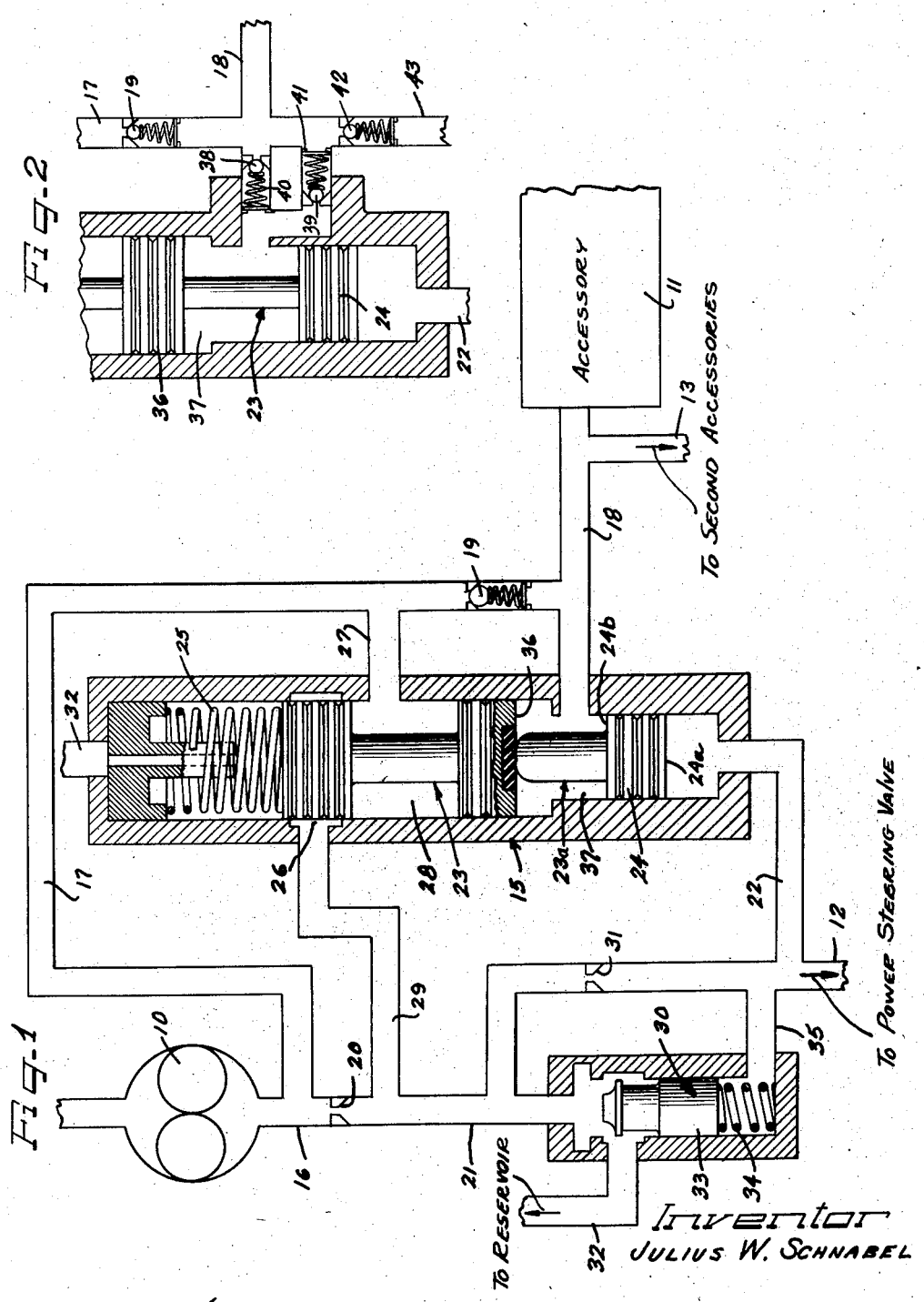

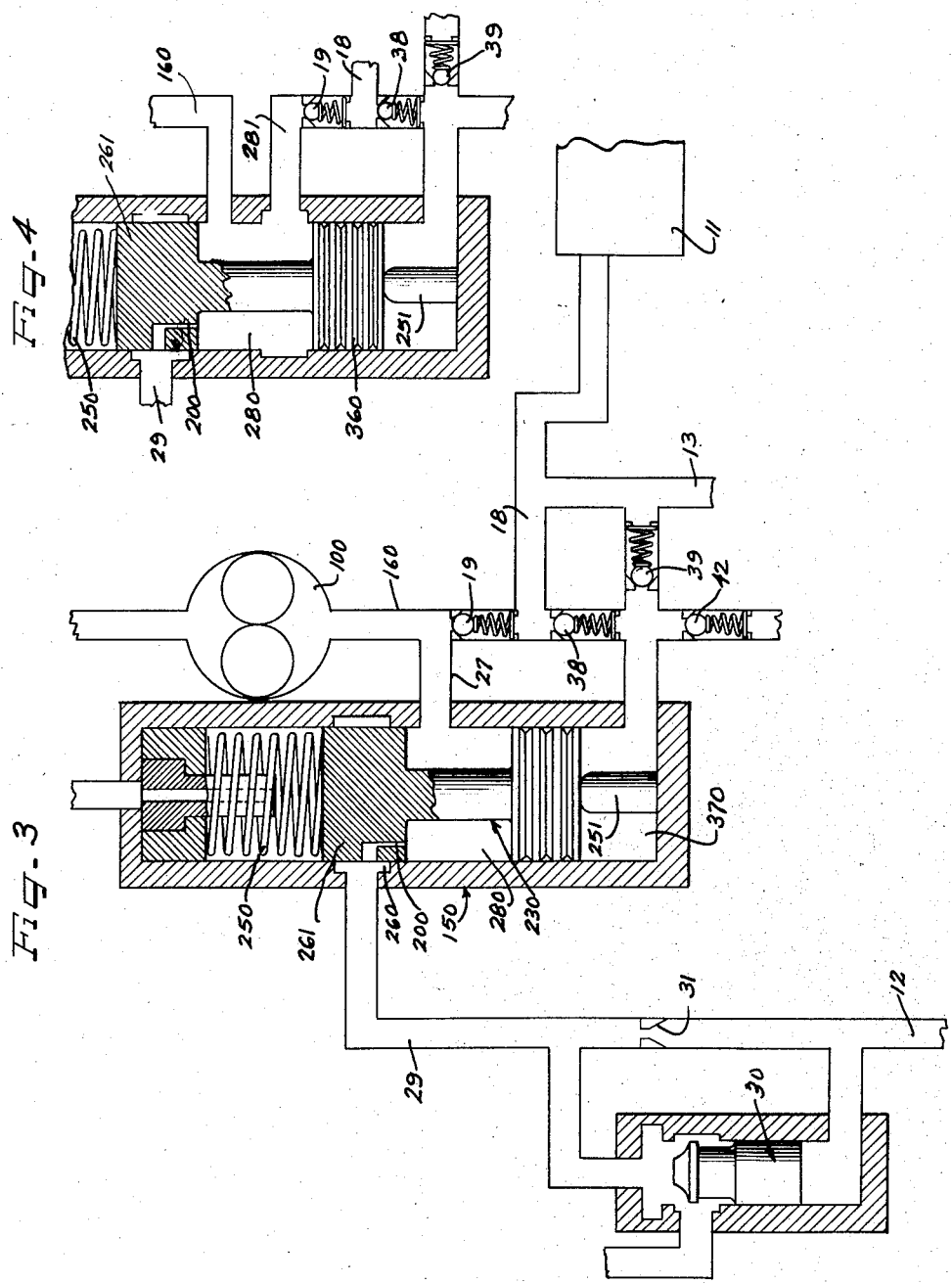

2,850,879

MULTIPLE ACCESSORY CONTROL VALVE

Julius W. Schnabel, Euclid, Ohio, assignor to Thompson Products, Inc., Cleveland, Ohio, a corporation of Ohio Application June 29, 1956, Serial No. 594,861

15 Claims. (Cl. 60—97)

The present invention relates to hydraulic systems and is, more particularly, concerned with the provision of a novel control system for automotive vehicle power steering and power accessory units.

As those skilled in the art of power accessory systems for vehicular use are aware, there has been a trend in the automotive industry to use an increasing number of power units as standard equipment in vehicles. Power accessories are, however, of two general types, namely, accessories designed to provide vehicular operating functions, such as brakes, steering, and the like; and accessories designed to provide power actuation of miscellaneous non-critical items such as hydraulic windows, seats, trunk lid, hydraulic jacks, and the like. While it has been considered desirable to provide a single power source for all of the accessories, the problem of providing such a source capable of providing power for the critical operative accessories at all times, independently of simultaneous operation of the non-critical accessories, has been a serious problem. While I am aware of the fact that several systems have been proposed for utilizing a single source of pressurized fluid for actuating a plurality of accessories and for providing dominance for one or more of the individual accessories in the system, such systems have not been completely satisfactory.

The present invention provides a hydraulic system for controlling a plurality of hydraulic accessories, some of which are operated through an acculator. The present system contemplates the provision of a single reciprocating valve for controlling hydraulic fluid flow to the various accessories and the single valve operates automatically to provide dominance for a critical power accessory such as for example power steering. The utilization of a single valve with relatively simple hydraulic circuits has permitted an extremely simple installation which permits the utilization of a single hydraulic pump for the entire automotive power accessory system without endangering the vehicle operator in any way.

In accordance with the principles of the present invention a single reciprocating valve core is provided for controlling the flow from a single hydraulic pump to a power steering control valve and, additionally, to an accumulator. The valve is, in one form, responsive to fluid pressure buildup in the power steering control valve and also to pressure buildup in the accumulator to disconnect the pump from the accumulator. In another form the buildup of pressure in the accumulator alone causes a disconnection of the pump from the accumulator. In either case, upon an increase in pressure at the power steering control valve, denoting steering operation, ample fluid from the pump is directed to the power steering control valve to operate the power steering independently of the pressure in the accumulator.

It is, accordingly, an object of the present invention to provide a simplified single control valve system for utilizing a single hydraulic fluid pump for operation of all of the power accessories on an automotive vehicle.

Still a further object of the present invention is to provide a simplified control system for automotive accessories in which complete domination of the system is provided for the most critical operational accessory.

Yet a further object of the present invention is to provide an improved selective power accessory system for vehicles having simplified automotive control.

A feature of the invention resides in the utilization of a single reciprocating spool valve having multiple diameters for directing the fluid output of a single hydraulic pump to a plurality of selected accessories depending upon pressure variations in the system.

Another feature of the present invention is the provision of a hydraulic triggering system to permit maximum accumulator charging by the hydraulic pump prior to pressure responsive shutoff movement of the valve.

Yet a further object of the present invention is to provide a combined power steering and accessory hydraulic pressure supply system and control valve capable of completely, automatically controlling the accessories of an automotive vehicle in a simplified, foolproof manner.

Still other and further objects and features of the present invention will at once become apparent to those skilled in the art from a consideration of the attached drawings wherein two preferred forms of the present invention are shown by way of illustration only, and wherein:

Figure 1 is a diagrammatic illustration of the hydraulic circuits and control valve of the present invention;

Figure 2 is a partial view, in diagrammatic form, of a modified form of the present invention;

Figure 3 is a partial view, in diagrammatic form of a further modified form of the present invention incorporating a simplified valve;

Figure 4 is a partial view, in diagrammatic form of a modified form of the invention shown in Figure 3;

Figure 5 is a still further simplified form of the form of the invention illustrated in Figure 3, in diagrammatic form; and Figure 6 is yet another modified form of the invention as illustrated in Figure 1.

As shown on the drawings:

As may be seen from a consideration of Figure 1, the present invention contemplates a hydraulic circuit having a hydraulic pump 10 adapted to supply hydraulic fluid under pressure to an accumulator 11, hydraulic non-critical power accessories (not shown), and a power steering system control valve preferably of the open-center type (likewise not shown). The particular type of power steering system employed is not a part of the present invention but it will be understood that the hydraulic system of the present invention is particularly useful when employed with open-center valves of the class generally illustrated in United States Patent No. 2,213,271 in which hydraulic fluid is by-passed directly through the power steering valve into the fluid reservoir when the valve is in a neutral condition. When such a power steering control valve is utilized there will be substantially no hydraulic pressure in the conduit 12 leading to the power steering valve when the power steering valve is in its neutral, inoperative position. Since the power steering valve is thus "open" during most of the time, it is essential that the accumulator and the conduit 13 leading to the secondary accessories be isolated from the power steering control valve when it is in the open condition, in order to prevent exhaustion of the accumulator. The interrelated control necessary is provided by means of control valve 15.

In the embodiment shown in Figure 1, the pump 10 has an output conduit 16 having a direct branch conduit 17 directing fluid under pressure to accumulator 11 by conduit 18 and check valve 19. A substantial restriction is placed in conduit 16 by means of an orifice ring 20 and, as a result, pressure is built up in the conduit 17 independently of the pressure downstream of restriction 20 in the conduit 21. The restriction 20 is sufficiently great to permit a buildup of pressure adequate to unseat check valve 19 and to charge accumulator 11 and actuate accessories connected to conduit 13 up to a point at which the pressure in conduit 18 exceeds a predetermined maximum design accumulator pressure. Ordinarily present-day systems provide an accumulator pressure, reflected in conduit 18 of approximately 750 pounds per square inch maximum. This value may, of course, vary with differing systems and the 750 pound per square inch value is merely considered representative. It will thus be seen that independently of power steering operation fluid under pressure from the pump 10 will be direct to the accumulator 11 and the secondary accessory conduit 13 when the pressure in the conduit 18 is below its maximum charged pressure.

When power steering is initiated the power steering control valve at the end of conduit 12 is partially closed building up a pressure in the conduit 12 for the energization of the power steering motor. This pressure is also applied to the control valve 15 by conduit 22 where it acts against the end of the reciprocating spool valve core 23a at face 24a of piston 24. The application of pressure to the face 24a moves the valve core 23a upwardly against core 23 compressing spring 25 and uncovering port 26 thereby permitting flow of hydraulic fluid from the conduit 17 to the conduit 21 via conduit 27, valve chamber 28, port 26 and conduit 29. As will be seen, this fluid path by-passes the restriction 20 permitting rapid flow of fluid at substantial pressure to the conduit 21 and from thence to the power steering control valve conduit 12 via a pressure regulating valve 30 acting in cooperation with a restricted orifice 31. The core 23a may be integral with core 23, but it is preferred that cores 23 and 23a be separate, as shown, since the bores in which they slide are of different diameters. By this arrangement absolute concentricity of the bores is unnecessary and production costs reduced.

The flow control valve 30 is conventional in construction and operates upon a buildup of excessive pressure in conduit 21 to by-pass a portion of the fluid flow to a low pressure sump or reservoir via conduit 32. The valve core 33 is biased upwardly to close off the conduit 32 by means of a spring 34 and also by means of a pressure feed-back supplied by conduit 35 connected with the power steering control valve conduit 12. It will thus be seen that pressure directed via conduit 21 to the power steering control valve conduit 12 will be regulated to provide a power steering supply of a predetermined optimum design flow at a predetermined pressure drop across the restriction 31. It will be obvious, insofar as the operation of the control valve 15 and the interrelationship between the power steering control valve and the accumulator is concerned, the elimination of the flow regulating valve 30 and the orifice 31 may be accomplished without modifiying the system. The flow regulating valve is, however, preferably employed since it has been found that its use in power steering systems minimizes power surges and other flow conditions adversely effecting the uniformity of power steering operation.

In order to prevent the power steering pump 10 from operating against continuous pressure during periods when the accumulator is charged to its maximum value and the power steering is not in operation, means are provided for by-passing the restriction 20 under such circumstances. As may be seen, the reciprocating valve core 23 is provided with a piston 36 which cooperates with the surface 24b of the piston 24 to form a chamber 37. The chamber 37 is hydraulically connected with the conduit 18 via a differential pressure valve 42 and accordingly is constantly at the same pressure as the pressure of the accumulator. This pressure acts to force core 23 upwardly against the spring 25. When the pressure in chamber 37, and the accumulator 11, reaches the predetermined maximum, or fully charged pressure, the spring 25 is overcome and the valve core 23 moves upwardly to connect conduits 27 and 29 thereby by-passing the output of the pump 10 to the open center power steering control valve which provides, when open, a substantially lesser back pressure in the system than the restricted orifice 20.

It will be noted that, with the arrangement illustrated in Figure 1, a substantial depletion of the pressure in the accumulator 11 would cause a low pressure to exist in the chamber 37 and conduit 18. If during the existance of such a low pressure, power steering were to be applied, the pump 10 would be required to deliver pressurized fluid to the power steering conduit 12 and to the accumulator 11 simultaneously via respective orifices 20 and that formed by the valve 19. It has been found that the provision of a restriction at 19 approximating the restriction at 20 will satisfactorily prevent diversion of the pressurized fluid to the accumulator and satisfactorily provide ample fluid under pressure to the power steering conduit 12.

In the embodiment illustrated in Figure 2, a triggering system is provided for moving the valve spool 23 upwardly to connect ports 27 and 29 under the circumstances of fully charged accumulator and non-operating power steering, in a rapid manner. As shown in Figure 2, the chamber 37 is connected to the conduit 18 by means of oppositely acting check valves 38 and 39. The check valve 38 has a spring 40 calibrated to open only when the pressure in conduit 18 builds up to the design maximum or fully charged pressure. On the other hand, the spring 41 of the check valve 39 is a weak spring and permits venting of the chamber 37 whenever the pressure therein is greater than the pressure in conduit 18.

With the arrangement shown in Figure 2 the pressure in chamber 37 will be at a low value, insufficient to by-pass orifice 20 by connecting conduits 27 and 29, whenever the pressure in conduit 18 is below the full charging pressure. As soon as the pressure in the conduit 18 reaches the full or maximum charging pressure the check valve 38 will open pressurizing the chamber 37 and immediately moving the valve spool 23 upwardly to connect conduits 27 and 29. This arrangement causes the valve 23 to move upwardly rapidly after the accumulator is fully charged but prevents gradual movements thereof against the spring 25 as the pressure in the accumulator approaches the fully charged value. A differential pressure of 150 per square inch has been found suitable for operation of valve 38 and this pressure, with spring 25 adjusted to open port 27 at a pressure of 600 per square inch in chamber 37 would provide accumulator 11 with a pressure of 750 per square inch.

As illustrated in Figure 2, the valve core 23 incorporates as an integral part thereof the piston 24. It will be appreciated that this change requires a recalibration of the spring 25 since the fluid pressure within the chamber 37 will act only differentially on the pistons 24 and 36 rather than directly on the piston 36 as in the embodiment illustrated in Figure 1.

It is preferred that a pressure relief valve 42 be provided in the system to limit the pressure therein under all circumstances. The relief valve 42 connects to a low pressure reservoir, or to conduit 32 by means of conduit 43, and is calibrated to open at a pressure slightly in excess of the pressure capable of opening check valve 38. Such a valve prevents any possibility of over-pressurizing the accumulator and secondary accessories and is also preferably provided in the system shown in Figure 1 by placing such a valve in the conduit 18 as shown.

In the somewhat simplified embodiment illustrated in Figure 3, the pump 100 supplies the power steering conduit 12 without utilization of a separate orifice 20 and conduit 17 as shown in Figure 1. Instead, conduit 160 leading from the pump 100 connects directly to conduit 27 leading to conduit 29 via chamber 280 and a restriction 200 in valve piston 261. The piston 261 is biased downwardly by a spring 250 against a stop 251 adjusted to permit closure of port 260 by the piston 261 except for the restricted passageway 200.

As in the case of the embodiment illustrated in Figure 2, the valve shown in Figure 3 is responsive to pressure in chamber 370 to move upwardly eliminating all restriction of flow of fluid under pressure from conduit 160 to conduit 29. Likewise, as in the embodiment shown in Figure 2, that in Figure 3 includes the provision of the triggering valve controls in the form of valves 38 and 39 preventing pressurization of the chamber 370 sufficient to eliminate the restriction 200 until a predetermined substantial pressure is reached in the accumulator 11.

As a result of the modification illustrated in Figure 3, a reduction in the number of parts is achieved without essential change in the operation of the valve core 230 and without eliminating the functions achieved by the restriction 20 shown in Figure 1. It will of course be understood that an override control in the form of an additional piston such as that shown at 24a in Figure 1 may be applied to the stop 251 in the embodiment shown in Figure 3 to eliminate the restriction 200 upon a buildup of power steering pressure. In actual practice this is in many instances unnecessary to the satisfactory operation of the device, however, where the valve 19 is provided with a restriction as above described such that the bulk of the output of the pump 100 can under no circumstances be bypassed to the accumulator 11 even where the accumulator is in a relatively depleted condition.

In the modification illustrated in Figure 4, a positive override is provided in a valve system such as illustrated in Figure 3, in the event that the accumulator is charged to a predetermined desired pressure. Thus, as shown, the pump outlet conduit 160 supplies chamber 280 directly and supplies conduit 29 via restricted orifice 200 in the manner shown in Figure 3. However, fluid flow to the accumulator conduit 18 via valve 19 must take place via chamber 280 and conduit 281 which will, upon the application of a predetermined desired maximum accumulator pressure, be closed off by upward movement of piston 240. With this arrangement it is impossible to excessively charge the accumulator under any circumstances.

In the form of the invention illustrated in Figure 5, the safety feature preventing overcharging of the accumulator 11 is achieved in the manner illustrated in Figure 4 but instead of providing the valves 38 and 39 to provide a triggering function as above described, the piston 365, corresponding to the piston 360 of Figure 4 is larger in diameter than piston 260. Accordingly, a force is applied downwardly against piston 365 upon the application of pressure to the chamber 280 sufficient to maintain the piston 365 against stop 251 until the pressure within the chamber 370, reflecting the pressure in the accumulator 11, reaches a predetermined desired value. Upon the attainment of such a pressure, the valve core will move upwardly bypassing the restriction 200 to apply the output of the pump 100 directly to the power steering conduit 29.

In the embodiment of the invention illustrated in Figure 6, positive power steering override control is provided which prevents any charging of the accumulator during operation of the power steering system. Further, in the arrangement illustrated in Figure 6, overcharging of the accumulator is impossible and high pressures may be permitted in the power steering system without adversely affecting the accessory system. As shown, the valve components are assentially the same as those shown in Figure 2, as well as Figure 1, wherein a piston 24 is acted upon by pressure in conduit 22 reflecting the pressure in the power steering fluid motors. This pressure acts against the valve 23 moving it upwardly to connect conduits 27 and 29 to bypass the restriction 20 in the pump outlet 16, not shown. However, as in the embodiment shown in Figure 4, the output of the pump is directed to the accessory system via the valve rather than directly. Thus, as may be seen, fluid under pressure enters the valve 15 via conduit 27, into chamber 28 and is directed to the accumulator 11 via conduit 18 and valve 19 via conduit 28a. Valves 38 and 39 provide the triggering action described above relative to Figure 2 and as a result, when the pressure in chamber 37 reaches a predetermined value the core 23 is moved upwardly to by-pass the restriction 20 and directly connect conduits 27 and 29. This action simultaneously closes off conduit 28a and until the pressure in the accumulator 11 drops, through accessory use, no further fluid under pressure may be applied to the accumulator.

If the power steering system is utilized a pressure buildup in conduit 22 occurs and, accordingly, the fluid pressure therein forces the piston 24 and spool core 23 upwardly to direct all of the output of the pump to conduit 29 via chamber 28. At the same time, the upward movement of the spool core 23 positively cuts off all circulation to the accumulator 11 by blocking the conduit 28a, thereby preventing any flow of hydraulic fluid to the accumulator during operation of the power steering apparatus. It will be understood that this arrangement provides an extremely safe and yet simple system in which the accessory system is completely subservient to the power steering and in which the accessory system can under no circumstances be over charged, even though an extremely high pressure is directed to the power steering system, a condition which may occur during parking or other conditions requiring unusually high steering torque.

It will thus be seen that I have provided a substantially improved and greatly simplified control valve system for central power systems adapted to supply hydraulic fluid under pressure to a power steering system and also to secondary accessories, and wherein a source of high pressure is at all times assured for the operation of the power steering motor. In accordance with the present invention an open-center power steering control valve may be utilized without adversely effecting charging of the high pressure accumulator or operation of secondary accessories. Further, upon completion of the accumulator charging operation, and during periods in which the power steering motor is not in operation, the output of the central pump is directed at a relatively low pressure to the reservoir thereby minimizing wear on the pump.

Since it would be obvious to those skilled in the art that variations and modifications may be made in the structures above used for illustration, without departing from the scope of the novel concepts of the present invention, it is my intention that the scope of the invention be limited solely by that of the hereinafter appended claims.

What is claimed is:

1. In combination in a central power system for supplying primary and secondary hydraulic accessories and an accumulator by a single hydraulic pump, a first conduit connecting the outlet of said pump to said secondary accessories and said accumulator, a second conduit connecting the outlet of the pump to the primary accessory, a check valve in said first conduit to prevent reverse flow therein, a restriction in said second conduit to permit pressure buildup in the first conduit independently of the pressure in said second conduit, a control valve for bypassing the restriction, and means responsive to a predetermined pressure in the secondary accessories and/or accumulator to actuate said valve to by-pass said restriction when said accumulator reaches said predetermined pressure.

2. In combination in a central power system for supplying primary and secondary hydraulic accessories and an accumulator by a single hydraulic pump, a first conduit connecting the outlet of said pump to said secondary accessories and said accumulator, a second conduit connecting the outlet of the pump to the primary accessory, a check valve in said first conduit to prevent reverse flow therein, a restriction in said second conduit to permit pressure build-up in the first conduit independently of the pressure in said second conduit, a third conduit connecting said first conduit to said second conduit at a point in the latter downstream of said restriction to by-pass the restriction, and a normally closed control valve in said third conduit responsive to the pressure in the primary and/or secondary accessories and/or accumulator to open said third conduit to by-pass said restriction when said accumulator is fully pressurized and/or said accessory is under pressure, said control valve comprising a reciprocal spool valve core spring biased into position to block said third conduit and having a first piston subjected to the pressure in said secondary accessories for moving the core against said spring in response to a predetermined pressure in said secondary accessories and said accumulator and having a second piston subjected to the pressure in said primary accessory for moving the core against said spring to open said third conduit.

3. In combination in a central power system for supplying primary and secondary hydraulic accessories and an accumulator by a single hydraulic pump, a first conduit connecting the outlet of said pump to said secondary accessories and said accumulator, a second conduit connecting the outlet of the pump to the primary accessory, a check valve in said first conduit to prevent reverse flow therein, a restriction in said second conduit to permit pressure build-up in the first conduit independently of the pressure in said second conduit, a third conduit connecting said first conduit to said second conduit at a point in the latter downstream of said restriction to by-pass the restriction, and a normally closed control valve in said third conduit responsive to the pressure in the primary and/or secondary accessories and/or accumulator to open said third conduit to by-pass said restriction when said accumulator is fully pressurized and/or said accessory is under pressure, said control valve comprising a reciprocal spool valve core spring biased into position to block said third conduit and having a first piston subjected to the pressure in said secondary accessories for moving the core against said spring in response to a predetermined pressure in said secondary accessories and said accumulator and having a second piston subjected to the pressure in said primary accessory for moving the core against said spring to open said third conduit and operative to move said core against said spring at a lesser pressure than necessary to move said first piston.

4. In combination in a central power system for supplying primary and secondary hydraulic accessories and an accumulator by a single hydraulic pump, a first conduit connecting the outlet of said pump to said secondary accessories and said accumulator, a second conduit connecting the outlet of the pump to the primary accessory, a check valve in said first conduit to prevent reverse flow therein, a restriction in said second conduit to permit pressure build-up in the first conduit independently of the pressure in said second conduit, a third conduit connecting said first conduit to said second conduit at a point in the latter downstream of said restriction to by-pass the restriction, and a normally closed control valve in said third conduit responsive to the pressure in the secondary accessories and the accumulator to open said third conduit to by-pass said restriction when said accumulator is fully pressurized.

5. In combination in a central power system for supplying primary and secondary hydraulic accessories and an accumulator by a single hydraulic pump, a first conduit connecting the outlet of said pump to said secondary accessories and said accumulator, a second conduit connecting the outlet of the pump to the primary accessory, a check valve in said first conduit to prevent reverse flow therein, a restriction in said second conduit to permit pressure build-up in the first conduit independently of the pressure in said second conduit, a third conduit connecting said first conduit to said second conduit at a point in the latter downstream of said restriction to by-pass the restriction, and a normally closed control valve in said third conduit responsive to the pressure in the secondary accessories and the accumulator to open said third conduit to by-pass said restriction when said accumulator is fully pressurized, said control valve comprising a reciprocal spool valve core spring-biased into position to block said third conduit and having a piston thereon subjected to the pressure in said secondary accessories and accumulator for moving the core against said spring in response to a predetermined pressure in said secondary accessories and said accumulator to open the third conduit.

6. In combination in a central power system for supplying primary and secondary hydraulic accessories and an accumulator by a single hydraulic pump, a first conduit connecting the outlet of said pump to said secondary accessories and said accumulator, a second conduit connecting the outlet of the pump to the primary accessory, a check valve in said first conduit to prevent reverse flow therein, a restriction in said second conduit to permit pressure build-up in the first conduit independently of the pressure in said second conduit, a third conduit connecting said first conduit to said second conduit at a point in the latter downstream of said restriction to by-pass the restriction, and a normally closed control valve in said third conduit responsive to the pressure in the primary and/or secondary accessories and/or accumulator to open said third conduit to by-pass said restriction when said accumulator is fully pressurized and/or said accessory is under pressure, said control valve comprising a single spool valve core reciprocably mounted in a housing, spring means biasing said core in one direction to close said third conduit, means referencing the pressure in said primary accessory against one end of said core to move the core against said spring means, piston means on said core, and means referencing the pressure in said secondary accessories and said accumulator against said piston to move said core against said spring to open said third conduit.

7. In combination in a central power system for supplying primary and secondary hydraulic accessories and an accumulator by a single hydraulic pump, a first conduit connecting the outlet of said pump to said secondary accessories and said accumulator, a second conduit connecting the outlet of the pump to the primary accessory, a check valve in said first conduit to prevent reverse flow therein, a restriction in said second conduit to permit pressure build-up in the first conduit independently of the pressure in said second conduit, a third conduit connecting said first conduit to said second conduit at a point in the latter downstream of said restriction to by-pass the restriction, and a normally closed control valve in said third conduit responsive to the pressure in the primary and/or secondary accessories and/or accumulator to open said third conduit to by-pass said restriction when said accumulator is fully pressurized and/or said accessory is under pressure, said control valve comprising a single spool valve core reciprocably mounted in a housing, spring means acting against one end of said core to bias said core in one direction to close said third conduit, means referencing the pressure in said primary accessory against the other end of said core to move the core against said spring means, piston means on said core intermediate the ends thereof, and means referencing the pressure in said secondary accessories and said accumulator against said piston to move said core against said spring to open said third conduit.

8. In combination in a central power system for supplying primary and secondary hydraulic accessories and an accumulator by a single hydraulic pump, a first conduit connecting the outlet of said pump to said secondary accessories and said accumulator, a second conduit connecting the outlet of the pump to the primary accessory, a check valve in said first conduit to prevent reverse flow therein, a restriction in said second conduit to permit pressure build-up in the first conduit independently of the pressure in said second conduit, a third conduit connecting said first conduit to said second conduit at a point in the latter downstream of said restriction to by-pass the restriction, and a normally closed control valve in said third conduit responsive to the pressure in the secondary accessories and the accumulator to open said third conduit to by-pass said restriction when said accumulator is fully pressurized, said control valve comprising a reciprocable spool valve core spring-biased into position to block said conduit and having a piston movable in a chamber by the pressure in said chamber to act against said spring to open said third conduit, a conduit connecting said chamber to said accessories and accumulator and a pressure responsive valve in said last-named conduit for preventing the flow of fluid under pressure into said chamber at pressures below the predetermined maximum accumulator pressure.

9. In combination in a central power system for supplying primary and secondary hydraulic accessories and and an accumulator by a single hydraulic pump, a first conduit connecting the outlet of said pump to said secondary accessories and said accumulator, a second conduit connecting the outlet of the pump to the primary accessory, a check valve in said first conduit to prevent reverse flow therein, a restriction in said second conduit to permit pressure build-up in the first conduit independently of the pressure in said second conduit, a third conduit connecting said first conduit to said second conduit at a point in the latter downstream of said restriction to by-pass the restriction, and a normally closed control valve in said third conduit responsive to the pressure in the secondary accessories and the accumulator to open said third conduit to by-pass said restriction when said accumulator is fully pressurized, said control valve comprising a reciprocable spool valve core spring-biased into position to block said conduit and having a piston movable in a chamber by the pressure in said chamber to act against said spring to open said third conduit, a conduit connecting said chamber to said accessories and accumulator and a pressure responsive valve in said last-named conduit for preventing the flow of fluid under pressure into said chamber at pressures below the predetermined maximum accumulator pressure, and check valve means in parallel with said pressure responsive valve and operative to vent said chamber to said last-named conduit when the pressure in said last-named conduit is less than the pressure in said chamber.

10. In combination in a central power system for supplying primary and secondary hydraulic accessories and an accumulator by a single hydraulic pump, a first conduit connecting the outlet of said pump to said secondary accessories and said accumulator, a second conduit connecting the outlet of the pump to the primary accessory, a check valve in said first conduit to prevent reverse flow therein, a restriction in said second conduit to permit pressure build-up in the first conduit independently of the pressure in said second conduit, a third conduit connecting said first conduit to said second conduit at a point in the latter downstream of said restriction to by-pass the restriction, and a normally closed control valve in said third conduit responsive to the pressure in the primary and/or secondary accesories and/or accumulator to open said third conduit to by-pass said restriction when said accumulator is fully pressurized and/or said accessory is under pressure, said control valve comprising a reciprocal spool valve core spring biased into position to block said third conduit and having a first piston subjected to the pressure in said secondary accessories for moving the core against said spring in response to a predetermined pressure in said secondary accessories and said accumulator and having a second piston subjected to the pressure in said primary accessory for moving the core against said spring to open said third conduit and operative to move said core against said spring at a lesser pressure than necessary to move said first piston, said control valve comprising a reciprocable spool valve core spring-biased into position to block said third conduit and having a piston movable in a chamber by the pressure in said chamber to act against said spring to open said third conduit, a conduit connecting said chamber to said accessories and accumulator and a pressure responsive valve in said last-named conduit for preventing the flow of fluid under pressure into said chamber at pressures below the predetermined maximum accumulator pressure.

11. In combination in a central power system for supplying primary and secondary hydraulic accessories and an accumulator by a single hydraulic pump, a first conduit connecting the outlet of said pump to said secondary accessories and said accumulator, a second conduit connecting the outlet of the pump to the primary accessory, a check valve in said first conduit to prevent reverse flow therein, a restriction in said second conduit to permit pressure buildup in the first conduit independently of the pressure in said second conduit, a third conduit connecting said first conduit to said second conduit at a point in the latter downstream of said restriction to by-pass the restriction, and a normally closed control valve in said third conduit responsive to the pressure in the primary and/or secondary accessories and/or accumulator to open said third conduit to by-pass said restriction when said accumulator is fully pressurized and/or said accessory is under pressure.

12. In combination in a central power system for supplying primary and secondary hydraulic accessories and an accumulator by a single hydraulic pump, a first conduit connecting the outlet of said pump to said secondary accessories and said accumulator, a second conduit connecting the outlet of the pump to the primary accessories, a check valve in said first conduit to prevent reverse flow therein, a restriction in said second conduit to permit pressure buildup in the first conduit independently of the pressure in said second conduit, a control valve for by-passing the restriction, and means responsive to a predetermined pressure in the secondary accessories and/or accumulator to actuate said valve to by-pass said restriction when said accumulator reaches said predetermined pressure, said restriction comprising a restricted orifice in a movable part of said valve.

13. In combination in a central power system for supplying primary and secondary hydraulic accessories and an accumulator by a single hydraulic pump, a first conduit connecting the outlet of said pump to said secondary accessories and said accumulator, a second conduit connecting the outlet of the pump to the primary accessories, a check valve in said first conduit to prevent reverse flow therein, a restriction in said second conduit to permit pressure buildup in the first conduit independently of the pressure in said second conduit, a control valve for by-passing the restriction, and means responsive to a predetermined pressure in the secondary accessories and/or accumulator to actuate said valve to by-pass said restriction when said accumulator reaches said predetermined pressure, said control valve comprising a reciprocal spool mounted in a housing and having a piston thereon normally biased into position to block said second conduit, means applying the pressure in said second conduit against one face of said piston, and a restricted orifice leading from said face to said second conduit downstream of said valve.

14. In combination in a central power system for supplying primary and secondary hydraulic accessories and an accumulator by a single hydraulic pump, a first conduit connecting the outlet of said pump to said secondary accessories and said accumulator, a second conduit connecting the outlet of the pump to the primary accessory, a check valve in said first conduit to prevent reverse flow therein, a restriction in said second conduit to permit pressure buildup in the first conduit independently of the pressure in said second conduit, a third conduit connecting said first conduit to said second conduit at a point in the latter downstream of said restriction to by-pass the restriction, and a normally closed control valve in said third conduit responsive to the pressure in the primary and/or secondary accessories and/or accumulator to open said third conduit to by-pass said restriction when said accumulator is fully pressurized and/or said accessory is under pressure and means responsive to a predetermined pressure in the secondary accessories and/or accumulator to block said first conduit when said accumulator reaches a predetermined maximum pressure.

15. In combination in a central power system for supplying primary and secondary hydraulic accessories and an accumulator by a single hydraulic pump, a first conduit connecting the outlet of said pump to said secondary accessories and said accumulator, a second conduit connecting the outlet of the pump to the primary accessory, a check valve in said first conduit to prevent reverse flow therein, a restriction in said second conduit to permit pressure buildup in the first conduit independently of the pressure in said second conduit, a third conduit connecting said first conduit to said second conduit at a point in the latter downstream of said restriction to by-pass the restriction, and a normally closed control valve in said third conduit responsive to the pressure in the primary and/or secondary accessories and/or accumulator to open said third conduit to by-pass said restriction when said accumulator is fully pressurized and/or said accessory is under pressure, means responsive to a predetermined pressure in the secondary accessories and/or accumulator to block said first conduit when said accumulator reaches a predetermined maximum pressure, and means responsive to the buildup of pressure in said second conduit for actuating said last named means to block said first conduit whereby actuation of said primary accessory will prevent further direction of fluid from said pump to said secondary accessories and accumulator.

References Cited in the file of this patent
UNITED STATES PATENTS

| 2,213,271 | Davis | Sept. 3, 1940 |
| 2,363,179 | Harrington et al. | Nov. 21, 1944 |
| 2,674,092 | Gardiner | Apr. 6, 1954 |